(12) United States Patent
Sakalley et al.

(10) Patent No.: US 8,886,874 B1
(45) Date of Patent: Nov. 11, 2014

(54) SYSTEM AND METHOD FOR LOW-LATENCY ADDRESSING IN FLASH MEMORY

(71) Applicants: Deboleena Minz Sakalley, Ghaziabad (IN); Rakesh Pandey, Ghaziabad (IN)

(72) Inventors: Deboleena Minz Sakalley, Ghaziabad (IN); Rakesh Pandey, Ghaziabad (IN)

(73) Assignee: Freescale Semiconductor, Inc., Austin, TX (US)

( * ) Notice: Subject to any disclaimer, the term of this patent is extended or adjusted under 35 U.S.C. 154(b) by 39 days.

(21) Appl. No.: 13/925,807

(22) Filed: Jun. 24, 2013

(51) Int. Cl.
*G06F 12/04* (2006.01)
*G11C 16/32* (2006.01)
*G11C 16/08* (2006.01)

(52) U.S. Cl.
CPC ............. *G11C 16/32* (2013.01); *G11C 16/08* (2013.01)
USPC .......................................... 711/103; 711/118

(58) Field of Classification Search
USPC .................................. 711/103, 118, 144, 154
See application file for complete search history.

(56) References Cited

U.S. PATENT DOCUMENTS

| | | | |
|---|---|---|---|
| 5,459,850 A * | 10/1995 | Clay et al. | 711/171 |
| 7,191,306 B2 | 3/2007 | Myoung | |
| 7,697,327 B2 | 4/2010 | Kim | |
| 8,015,345 B2 | 9/2011 | Laurent | |
| 8,045,376 B2 | 10/2011 | Lee | |
| 8,417,880 B2 | 4/2013 | Lam | |
| 2005/0005149 A1 * | 1/2005 | Hirota et al. | 713/193 |
| 2010/0332730 A1 | 12/2010 | Royer | |

* cited by examiner

*Primary Examiner* — Vu Le
(74) *Attorney, Agent, or Firm* — Charles Bergere (57) ABSTRACT

A system for operating a flash memory includes a memory controller in communication with a processor. The memory controller includes a memory read access command receiver that receives a memory read access command from the processor. The memory read access command includes a memory cell address of a memory cell to be accessed for the execution of the memory read accessed command. The memory cell address includes a current sector address and a sector specific memory cell address. The flash memory is provided with either both the current sector address and the sector specific memory cell address or only the sector specific memory cell address for generating the memory cell address.

10 Claims, 6 Drawing Sheets

| Sector Size (KB) | Sector Count | Sector Address Range | Memory Cell Address Range |
|---|---|---|---|
| 4 | 32 | SA00 | 000000h-00000Fh |
|  |  | : | : |
|  |  | SA31 | 0001F00h-0001FFFh |
| 64 | 254 | SA32 | 0002000h-002FFFFh |
|  |  | : | : |
|  |  | SA285 | 00FF000h-00FFFFFh |

SYSTEM AND METHOD FOR LOW-LATENCY ADDRESSING IN FLASH MEMORY

BACKGROUND OF THE INVENTION

The present invention relates generally to memory devices, and more particularly, to a system and method for low-latency addressing in a flash memory.

Flash memories, particularly NOR flash memories, are a type of non-volatile semiconductor memories capable of retaining stored data even when power to the memory is turned off. Due to their non-volatile nature, flash memories are used in limited power applications, viz., battery powered mobile phones, personal digital assistants (PDAs), laptops, netbooks, and the like.

A NOR flash memory includes a plurality of sectors of varying sizes, e.g., 4 kilobyte (KB), 64 KB, and 256 KB. Depending on the sector size, the flash memory includes a varying count of memory cells. The design of the NOR flash memory enables individual addressing of each memory cell, which increases access speed to each memory cell. The fast and random-access nature of NOR flash memories renders them ideal for storing operating systems of battery powered devices.

Memory cells of a conventional NOR flash memory may be addressed either serially or in parallel. Serial addressing entails fetching and storing data in plurality of cycles of a serial clock signal. An exemplary serial data fetch sequence is illustrated in FIG. 1.

Figure 1:
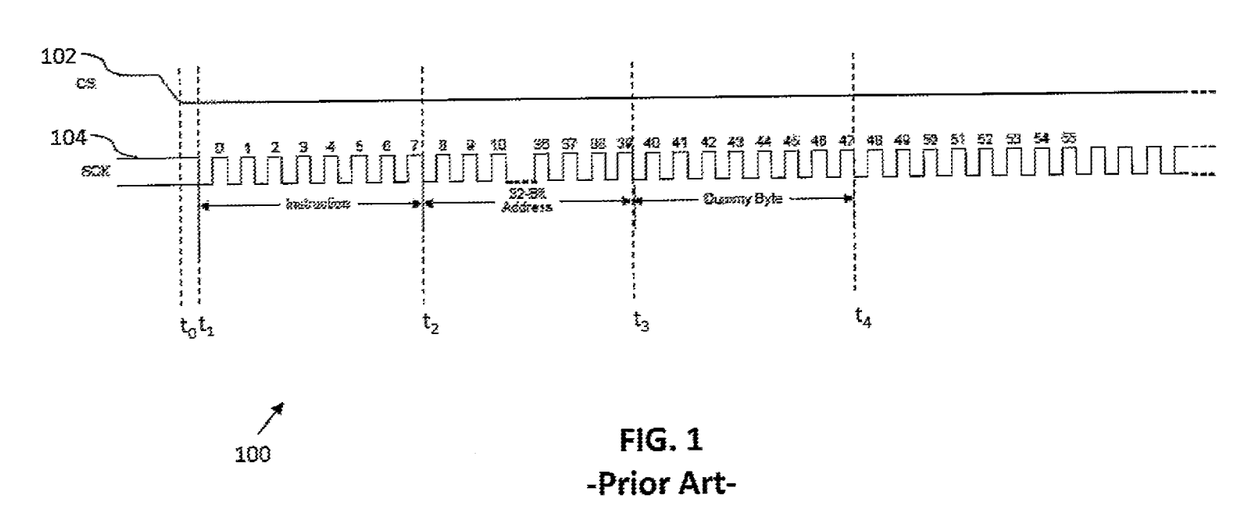
FIG. 1 is a timing diagram of a conventional data fetch sequence in a serial NOR flash memory.

FIG. 1 is a timing diagram 100 that illustrates a conventional data fetch sequence in a serial NOR flash memory. The timing diagram 100 includes a chip select (CS) signal 102 and a serial clock (SCK) signal 104.

At time $t_0$, the CS signal 102 transitions to an active low state, which indicates the beginning of a data fetch sequence. At time $t_1$, the SCK signal 104 transitions to active low state signaling initiation of an instruction cycle of the serial NOR flash memory. During the instruction cycle, an instruction received from an external processor (not shown) is transmitted to the flash memory by way of a memory controller. Typically, the instruction cycle includes 8 clock cycles of the SCK signal 104 to enable transmission of an 8-bit instruction received from the processor. At time $t_2$, an address cycle is initiated, during which an address of a memory cell to be accessed is provided to the flash memory. A memory cell address includes 32 bits necessitating the address cycle to last for 32 clock cycles of the SCK signal 104. The address bits of a 32-bit memory cell address may be divided into 8 most significant bits (MSBs) that correspond to a sector address of a sector associated with the memory cell and 24 least significant bits (LSBs) that correspond to a sector specific address that is used to locate the memory cell in the sector. During the address cycle, the 8 MSBs and 24 LSBs are transmitted to the flash memory by the memory controller. At time $t_3$, the address cycle ends and a dummy data cycle is initiated that continues until time $t_4$ at which a data cycle is initiated during which data read from the memory cell is output.

Since NOR flash memories provide a reliable and fast access storage environment, they are being increasingly used to implement execute-in-place (XiP) functionality in portable battery powered devices. The XiP functionality entails execution of programs directly from the flash memory rather than executing the programs in the traditional copy and execute mode in which the programs are copied into a random access memory (RAM) followed by their execution.

However, implementing XiP for performance-intensive applications requires the flash memory to execute low-latency data fetch operations. In the above-described data fetch sequence, code stored in non-contiguous memory locations, i.e., in groups of memory cells spread across multiple sectors, slows down the fetch sequence. Since each fetch sequence includes transmission of complete 32-bit memory cell address to the serial flash memory, fetching data from multiple sectors renders the XiP functionality less effective for performance-intensive applications as compared to the traditional copy and execute mode.

Therefore, it would be advantageous to have a system and method for providing an addressing scheme for a serial NOR flash memory that reduces duration of address cycles, reduces latency of the data fetch sequence, and that overcomes the above-mentioned limitations of conventional serial NOR flash memory addressing schemes.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE PRESENT INVENTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a method for operating a flash memory performed by a memory controller is provided. The memory controller is in communication with a processor, and the flash memory includes a plurality of sectors, each sector including a plurality of memory cells. The method includes populating an internal table in the memory controller with a plurality of attributes corresponding to the plurality of sectors. The plurality of attributes includes a sector size, sector count, sector address range, and memory cell address range. A first memory read access command is received from the processor. The memory read access command includes a plurality of address bits corresponding to a memory cell address of a memory cell that is currently being accessed. The plurality of address bits includes a first set of sector address bits corresponding to a current sector address of a current sector associated with the memory cell and a first set of memory cell address bits corresponding to a sector specific memory cell address of the memory cell.

The current sector address is compared with a previous sector address stored in the memory controller and the flash memory. The previous sector address corresponds to a previous sector accessed during execution of a previous memory read access command. The first set of memory cell address bits are transmitted to the flash memory during an address cycle of the first memory read access command when the previous sector address and the current sector address are identical. The previous sector address stored in the memory controller and the flash memory is replaced with the current sector address when the previous sector address and the current sector address are different. The plurality of address bits is transmitted to the flash memory during the address cycle of the first memory read access command when the previous sector address and the current sector address are different. The flash memory receives either the first set of memory cell address bits or the plurality of address bits. The current sector address is appended to the sector specific memory cell address by the flash memory to generate the memory cell address. The memory cell is accessed by the flash memory using the memory cell address.

In another embodiment of the present invention, a memory controller for operating a flash memory is provided. The memory controller is in communication with a processor and the flash memory includes one or more sectors, each sector including a plurality of memory cells. The memory controller includes an internal table generator for populating and storing an internal table with one or more attributes corresponding to the one or more sectors. The one or more attributes includes a sector size, sector count, sector address range, and memory cell address range. The internal table is stored in the memory controller. The memory controller includes a memory read access command receiver for receiving a first memory read access command from a processor. The first memory read access command includes a plurality of address bits corresponding to a memory cell address of a memory cell that is currently being accessed to execute the first memory read access command. The plurality of address bits includes a first set of sector address bits corresponding to a current sector address of a current sector associated with the memory cell and a first set of memory cell address bits corresponding to a sector specific memory cell address of the memory cell.

The memory controller further includes a sector address comparator for comparing the current sector address with a previous sector address stored in both the memory controller and the flash memory corresponding to a previous sector accessed during execution of a previous memory read access command. The sector address comparator replaces the previous sector address stored in the memory controller and the flash memory with the current sector address when the previous sector address and the current sector address are different. The sector address comparator accesses the internal table to read the current sector address for transmitting to the flash memory.

The memory controller further includes an address transmitter for transmitting either the plurality of address bits or the first set of memory cell address bits to the flash memory during an address cycle of the first memory read access command based on the comparison of the previous sector address with the current sector address.

The flash memory appends the current sector address to the sector specific memory cell address to generate the memory cell address when the previous sector address and the current sector address are identical. The flash memory accesses the memory cell using the memory cell address.

Various embodiments of the present invention provide a system and method for operating a flash memory. The system includes a memory controller in communication with a processor. The memory controller includes a memory read access command receiver that receives a memory read access command from the processor. The memory read access command includes a memory cell address of a memory cell that needs to be accessed for the execution of the memory read accessed command. The memory cell address includes a current sector address and a sector specific memory cell address. The memory controller further includes a sector address comparator that compares the current sector address present in the memory read access command with a previous sector address that corresponds to a previous sector accessed during a previous memory access command. The previous sector address is stored in both the flash memory and the memory controller. The memory controller further includes an address transmitter for transmitting only the sector specific memory cell address to the flash memory when the current sector address and the previous sector address are identical. The address transmitter transmits the sector specific memory cell address to the flash memory during an address cycle of the memory read access command. The flash memory appends the sector specific memory cell address to the current sector address stored therein to generate the memory cell address that is used for accessing the memory cell. Since, instead of complete memory cell address only the sector specific memory cell address is transmitted to the flash memory, the address cycle duration of the memory read access command is reduced. The reduction in the duration of the address cycle leads to faster execution of read access commands especially when flash memory contents are stored in non-contiguous memory locations. Since, only the sector specific memory cell address is transmitted during the address cycle when memory cells of the same sector are accessed, the total access time required for accessing the memory cells associated with the same sector is reduced. Thus, when memory cells spread across multiple sectors are accessed, an overall saving in the access time is obtained, which renders implementation of the XiP functionality a feasible and effective option in flash memories.

Figure 2:
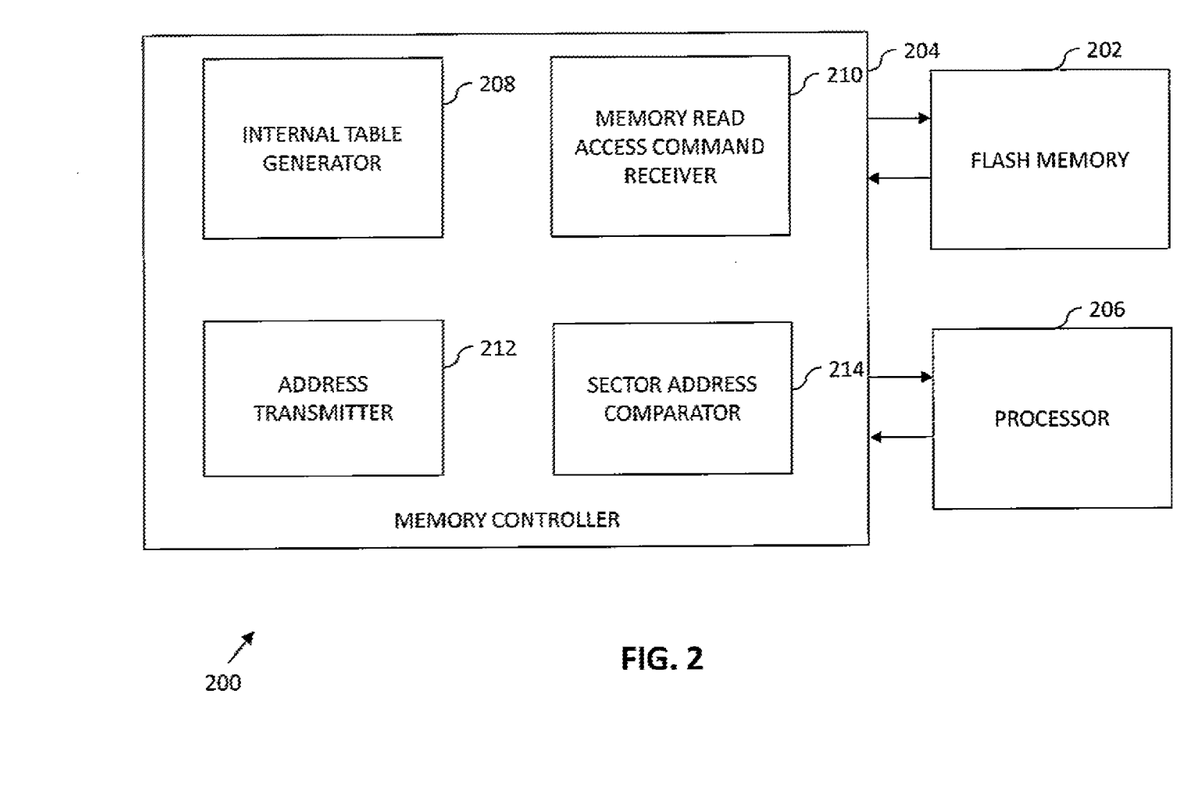
FIG. 2 is a schematic block diagram of a flash memory system in accordance with an embodiment of the present invention.

Referring now to FIG. 2, a system 200 for operating a flash memory 202 in accordance with an embodiment of the present invention, is shown. The system 200 includes a processor 206, and a memory controller 204. The memory controller 204 includes an internal table generator 208, a memory read access command receiver 210, an address transmitter 212, and a sector address comparator 214.

The internal table generator 208 populates and stores an internal table (refer FIG. 3) with attributes corresponding to sectors of the flash memory 202. The flash memory 202 is organized as a combination in to of multiple sectors of varying sizes, viz., 4 kilobyte (KB), 64 KB, and 356 KB. Depending on the size of a sector, the sector includes a varying count of memory cells. In an embodiment of the present invention, the attributes include a sector size, sector count, sector address range, and memory cell address range and the internal table is stored in the memory controller 204. In various embodiments of the present invention, the flash memory 202 is a serial NOR flash memory. The internal table is used to read a sector address during a data fetch sequence in the flash memory 202.

The memory read access command receiver 210 receives a memory read access command from the processor 206. The memory read access command includes multiple address bits, instruction bits, dummy data bits, and data bits. The multiple address bits correspond to a memory cell address of a memory cell that is to be accessed for executing the memory read access command. The address bits include a set of sector address bits that correspond to a current sector address of a current sector associated with the memory cell and a set of memory cell address bits corresponding to a sector specific memory cell address of the memory cell. The current sector address is used to access a particular sector and then the sector specific address of the memory cell is used to locate the memory cell in that particular sector. In an embodiment of the present invention, the memory read access command includes 32 address bits of which 8 most significant bits (MSBs) correspond to the set of sector address bits and remaining 24 least significant bits (LSBs) correspond to the set of memory cell address bits.

Upon receiving the memory read access command, the sector address comparator 214 compares the current sector address with a previous sector address stored in both the memory controller 204 and the flash memory 202. The previous sector address corresponds to a previous sector accessed during execution of a previous memory read access command. The sector address comparator 214 replaces the previous sector address stored in the memory controller 204 and the flash memory 202 with the current sector address when the previous sector address and the current sector address are different. The sector address comparator 214 accesses the internal table to ascertain the current sector address based on the address bits received as a part of the memory read access command. The current sector address is then transmitted for storage in the flash memory 202.

The address transmitter 212 transmits the complete set of address bits, i.e., both the MSBs and the LSBs, when a memory cell associated with the current sector address is different from the previous sector address. Further, the address transmitter 212 transmits only the memory cell address bits, i.e., only the LSBs, to the flash memory 202 when the current sector address and the previous sector address are identical.

The flash memory 202 uses complete set of address bits received from the address transmitter 212 to access the memory cell when the current sector address is different from the previous sector address. Further, the flash memory 202 appends the stored current sector address to the sector specific memory cell address received from the address transmitter 212 to generate the memory cell address when the previous sector address and the current sector address are identical. Subsequently the flash memory 202 accesses the memory cell corresponding to the memory cell address.

Figure 3:
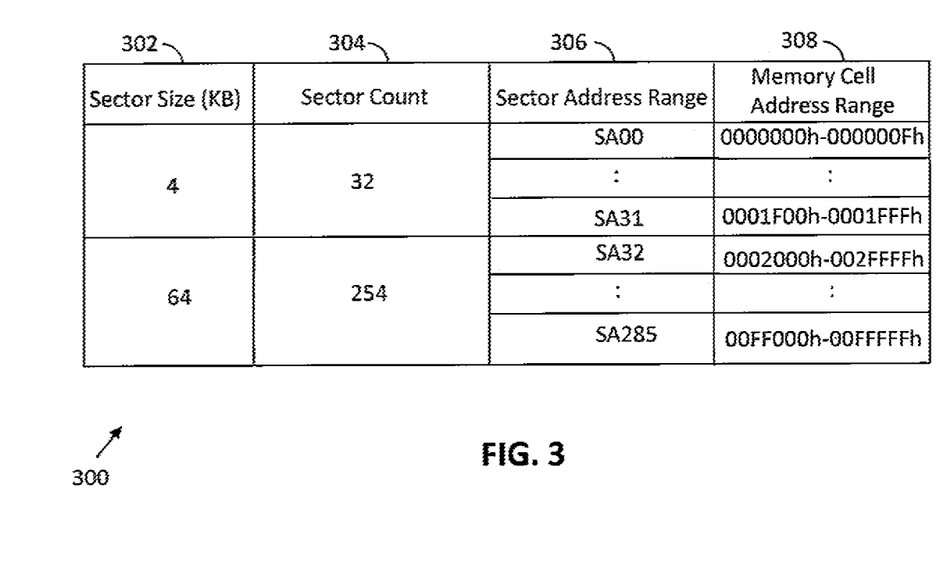
FIG. 3 is a schematic block diagram of an internal table of the flash memory system of FIG. 2.

Referring now to FIG. 3, a schematic diagram of an internal table 300 in accordance with an embodiment of the present invention, is shown. The internal table 300 includes first through fourth columns 302-308. The first through fourth columns 302-308 stores various attributes of the multiples sectors of the flash memory 202. The internal table generator 208 populates the internal table 300 with the various attributes of the flash memory 202. In an embodiment of the present invention, the first column 302 stores sector sizes in KBs of the multiple sectors of the flash memory 202. For example, the sector sizes may be 4 KB, 64 KB, or 256 KB. The second column 304 stores a count of sectors having a particular sector size. For example, 32 sectors may have a sector size of 4 KB, and 254 sectors may have a sector size of 64 KB. The third column 306 stores address ranges of the various sectors and the fourth column 308 stores memory cell address ranges of the memory cells associated with the various sectors.

Figure 4:
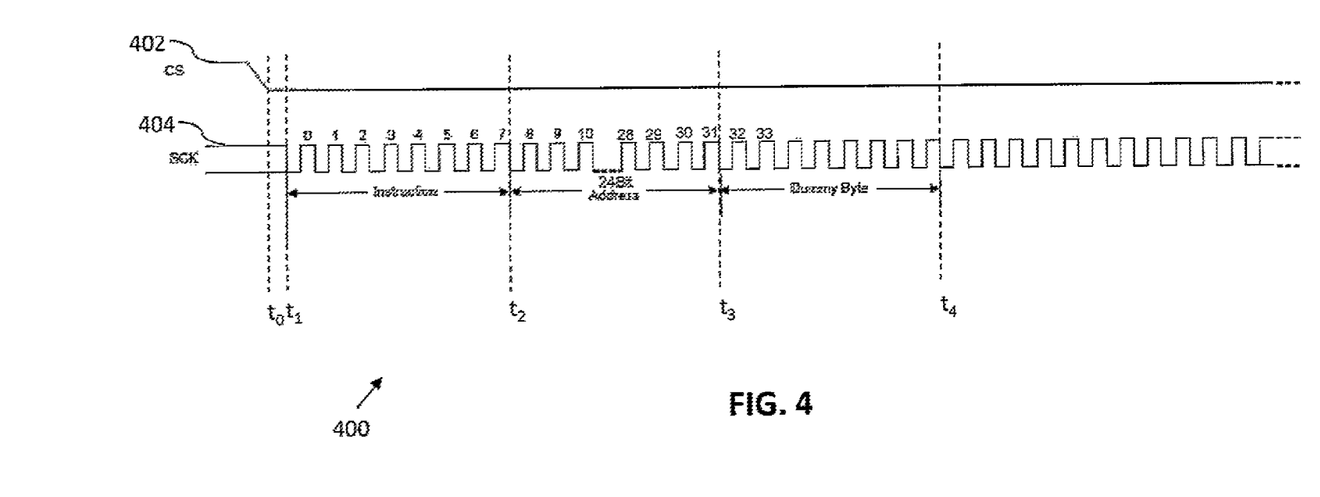
FIG. 4 is a timing diagram of a data fetch sequence in the flash memory of FIG. 2.

Referring now to FIG. 4, a timing diagram 400 of a data fetch sequence in the flash memory 202 in accordance with an embodiment of the present invention, is shown. The clock-timing diagram 400 includes a chip select (CS) signal 402 and a serial clock (SCK) signal 404. At time $t_0$, the CS signal 402 transitions to active low state. This signals beginning of the data fetch sequence. At time $t_1$, the SCK signal 404 transitions to active low state signaling initiation of an instruction cycle of the flash memory 202. During the instruction cycle, an instruction for the flash memory 202 is transmitted from the memory controller 204 to the flash memory 202. Typically, the instruction cycle spreads over 8 clock cycles of the SCK signal 404 to enable transmission of an 8-bit instruction received initially from the processor 206 to the flash memory 202. At time $t_2$, an address cycle is initiated, during which an address of a memory cell to be addressed is provided to the flash memory 202 by the memory controller 204. In the example depicted the current sector address is identical to the previous sector address stored in the memory controller 204 and the flash memory 202. As a result, only the set of memory cell address bits, i.e., the 24 LSBs, need to be transmitted to the flash memory 202. Therefore the address cycle continues only for 24 clock cycles of the SCK signal 404 as opposed to 32 clock cycles during the transmission of the both the MSBs and the LSBs. At time $t_3$, the address cycle ends and a dummy data cycle is initiated during which the dummy data bits are transmitted from the memory controller 204 to the flash memory 202. The dummy data cycle continues until time $t_4$ at which a data cycle initiated during which data bits read from the memory cell are output.

Figure 5A:
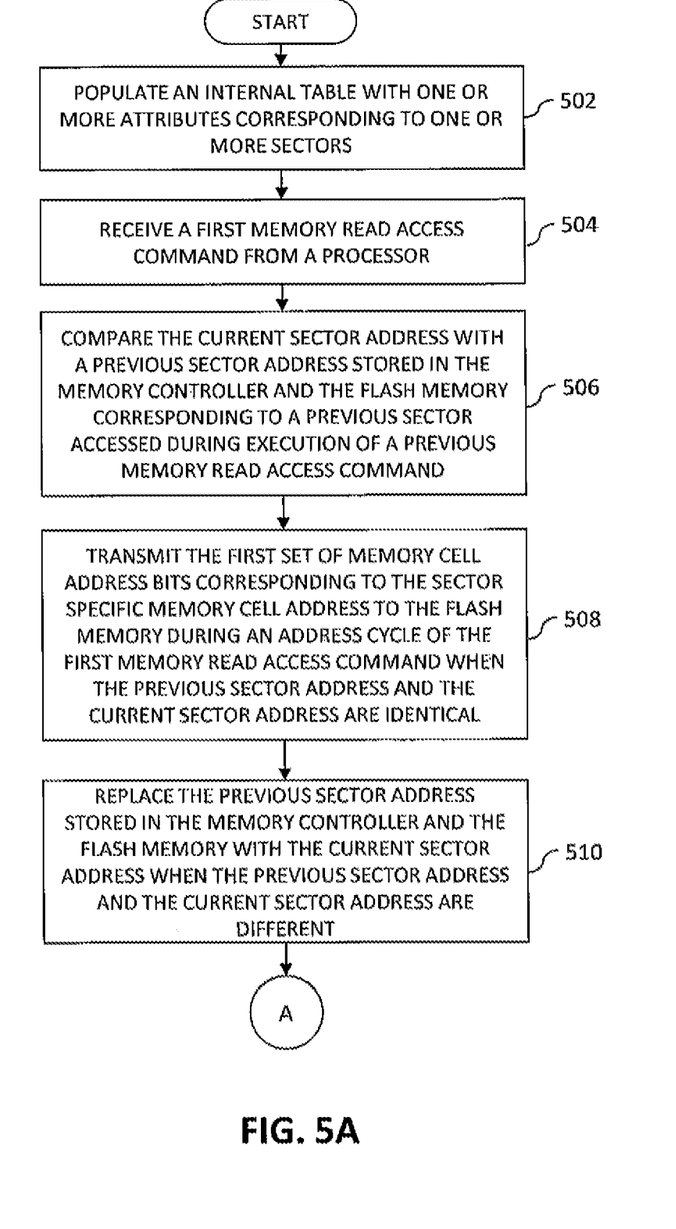
FIGS. 5A and 5B are a flow chart of a method for operating the flash memory of FIG. 2.
Figure 5B:
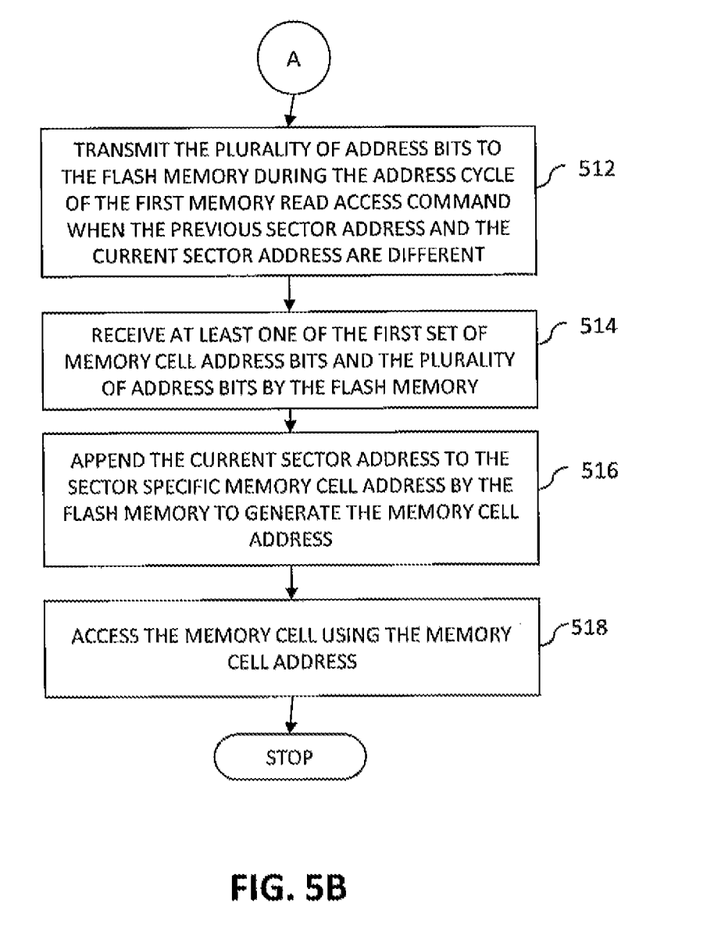

Referring now to FIGS. 5A and 5B, a flowchart of a method for operating a flash memory in accordance with an embodiment of the present invention, is shown.

At step 502, the internal table 300 is populated with attributes that correspond to sectors of the flash memory 202. In an embodiment of the present invention, the plurality of attributes includes at least one of a sector size, sector count, sector address range, and memory cell address range. In an embodiment of the present invention, the internal table 300 is populated by the internal table generator 208 and the internal table 300 is stored in the memory controller 204. At step 504, a memory read access command is received from the processor 206. The memory read access command includes multiple address bits corresponding to a memory cell address of a memory cell that needs to be accessed for executing the memory read access command. The address bits include a set of sector address bits that correspond to a current sector address of a current sector associated with the memory cell and a set of memory cell address bits corresponding to a sector specific memory cell address of the memory cell. The current sector address is used to access a particular sector and then the sector specific address of the memory cell is used to locate the memory cell in that particular sector. In an embodiment of the present invention, the memory read access command includes 32 address bits of which 8 MSBs correspond to the set of sector address bits and remaining 24 LSBs correspond to the set of memory cell address bits. The memory read access command is received by the memory read access command receiver 210.

At step 506, the current sector address is compared with a previous sector address stored in the memory controller 204 and the flash memory 202. The previous sector address corresponds to a previous sector accessed during execution of a previous memory read access command. The sector address comparator 214 compares the current sector address with the previous sector address. In an embodiment of the present invention, the sector address comparator 214 marks one of the sectors of the flash memory 202 as a default sector for an initial memory read access command received by the memory controller 204. The sector address comparator 214 stores a default sector address corresponding to the default sector in the memory controller 204 and the flash memory 202 and compares it with a current sector address received in the initial memory read access command.

At step 508, the set of memory cell address bits corresponding to the sector specific memory cell address is transmitted to the flash memory 202 during an address cycle of the memory read access command. The address transmitter 212 transmits the set of memory cell address bits to the flash memory 202 when the previous sector address and the current sector address are identical.

At step 510, the previous sector address stored in the memory controller 204 and the flash memory 202 is replaced with the current sector address. The sector address comparator 214 replaces the previous sector address with the current sector address when previous and current sector addresses are different. In an embodiment of the present invention, the sector address comparator 214 replaces the default sector address with the current sector address when the default sector address and the current sector address are different.

At step 512, the multiple address bits, i.e., both MSBs and the LSBs, received as the part of the memory read access command are transmitted to the flash memory 202. The address transmitter 212 transmits the multiple address bits to the flash memory 202 during the address cycle of the memory read access command when the previous sector address and the current sector address are different. At step 514, the set of memory cell address bits, i.e., the LSBs, or the multiple address bits, i.e., both the MSBs and the LSBs, are received by the flash memory 202. At step 516, the current sector address is appended to the sector specific memory cell address, i.e., the LSBs, by the flash memory 202 to generate the memory cell address. At step 518, the memory cell is accessed by the flash memory 202 by using the memory cell address either generated by appending the current sector address to the sector specific memory cell address or received in entirety, i.e., the multiple address bits from the address transmitter 212.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A method for operating a flash memory performed by a memory controller, wherein the memory controller is in communication with a processor, and the flash memory includes a plurality of sectors, each sector including a plurality of memory cells, the method comprising:
   populating an internal table in the memory controller with a plurality of attributes corresponding to the plurality of sectors, wherein the plurality of attributes includes at least one of a sector size, sector count, sector address range, and memory cell address range;
   receiving a first memory read access command from the processor that includes a plurality of address bits corresponding to a memory cell address of a memory cell that is currently being accessed, wherein the plurality of address bits includes a first set of sector address bits corresponding to a current sector address of a current sector associated with the memory cell, and a first set of memory cell address bits corresponding to a sector specific memory cell address of the memory cell;
   comparing the current sector address with a previous sector address stored in the memory controller and the flash memory, wherein the previous sector address corresponds to a previous sector accessed during execution of a previous memory read access command;
   transmitting the first set of memory cell address bits to the flash memory during an address cycle of the first memory read access command when the previous sector address and the current sector address are identical;
   replacing the previous sector address stored in the memory controller and the flash memory with the current sector address when the previous sector address and the current sector address are different;
   transmitting the plurality of address bits to the flash memory during the address cycle of the first memory read access command when the previous sector address and the current sector address are different;
   receiving at least one of the first set of memory cell address bits and the plurality of address bits by the flash memory;
   appending the current sector address to the sector specific memory cell address by the flash memory to generate the memory cell address; and
   accessing the memory cell using the memory cell address.

2. The method of claim 1, further comprising marking at least one of the one or more sectors as a default sector for an initial memory read access command received by the memory controller.

3. The method of claim 2, further comprising storing a default sector address corresponding to the default sector in both the memory controller and the flash memory.

4. The method of claim 1, wherein the first memory read access command further includes a plurality of instruction bits, a plurality of dummy data bits, and a plurality of data bits.

5. The method of claim 1, wherein the flash memory is a serial NOR flash memory.

6. A memory controller for operating a flash memory, wherein the memory controller is in communication with a processor, wherein the flash memory includes one or more sectors, each sector including a plurality of memory cells, the memory controller comprising:
   an internal table generator for populating and storing an internal table with one or more attributes corresponding to the one or more sectors, wherein the one or more attributes includes at least one of a sector size, sector address, and memory cell address range, wherein the internal table is stored in the memory controller;
   a memory read access command receiver for receiving a first memory read access command from the processor, wherein the first memory read access command includes a plurality of address bits corresponding to a memory cell address of a memory cell that is currently accessed to execute the first memory read access command, wherein the plurality of address bits includes a first set of sector address bits corresponding to a current sector address of a current sector associated with the memory cell and a first set of memory cell address bits corresponding to a sector specific memory cell address of the memory cell;
   a sector address comparator for comparing the current sector address with a previous sector address stored in both the memory controller and the flash memory corresponding to a previous sector accessed during execution of a previous memory read access command and replacing the previous sector address stored in the memory controller and the flash memory with the current sector address when the previous sector address and the current sector address are different, wherein the sector address comparator accesses the internal table to read the current sector address for transmitting to the flash memory; and an address transmitter for transmitting at least one of the plurality of address bits and the first set of memory cell address bits to the flash memory during an address cycle of the first memory read access command based on the comparison of the previous sector address with the current sector address, wherein the flash memory appends the current sector address to the sector specific memory cell address to generate the memory cell address when the previous sector address and the current sector address are identical, and wherein the flash memory accesses the memory cell using the memory cell address.

7. The memory controller of claim 6, wherein the sector address comparator marks at least one of the one or more sectors as a default sector for an initial memory read access command received by the memory controller.

8. The memory controller of claim 7, wherein the sector address comparator stores a default sector address corresponding to the default sector in the memory controller and the flash memory.

9. The memory controller of claim 6, wherein the first memory read access command further includes a plurality of instruction bits, a plurality of dummy data bits, and a plurality of data bits.

10. The memory controller of claim 6, wherein the flash memory is a serial NOR flash memory.

* * * * *